INVENTOR
JOHN HOHL
ATTORNEYS

Nov. 15, 1960 J. HOHL 2,959,847
APPARATUS FOR UNLOADING RINGS FROM A MANDREL
Original Filed May 5, 1955 7 Sheets-Sheet 7

INVENTOR
JOHN HOHL
BY
ATTORNEYS

# United States Patent Office 2,959,847
Patented Nov. 15, 1960

2,959,847

APPARATUS FOR UNLOADING RINGS FROM A MANDREL

John Hohl, Toledo, Ohio, assignor to Owens-Illinois Glass Company, a corporation of Ohio Original application May 5, 1955, Ser. No. 506,339, now Patent No. 2,813,331, dated Nov. 19, 1957. Divided and this application June 21, 1956, Ser. No. 592,821

4 Claims. (Cl. 29—235)

The present invention relates to apparatus for unloading rings from a mandrel and particularly for removing from a mandrel ring gaskets which have been formed by cutting a tube of rubber or like material into a multiplicity of rings while the tube is mounted on the mandrel.

The invention is herein illustrated as embodied in an apparatus adapted for loading the rubber tubes on mandrels preparatory to cutting the tubes into gaskets by a ring gasket cutting machine, said apparatus including means for thereafter removing the cut rings or gaskets from the mandrels. In accordance with the present invention a mandrel with a tube thereon which has been cut into ring gaskets is supported in a cradle in alignment with an air cylinder or motor. A tubular member or cylinder connected to the motor piston and in longitudinal register with the mandrel is advanced lengthwise by the motor on to the mandrel so that the ring gaskets are forced off the mandrel as the latter enters the cylinder. The invention provides means for supplying air pressure through the cylinder and between the mandrel and the gaskets thereon to expand the gaskets, permitting them to move freely off the mandrel. The supply of air under pressure is restricted during the initial forward movement of the cylinder. A comparatively high air pressure is maintained within the cylinder during its retraction to prevent any liability of the mandrel being withdrawn with the cylinder.

The present application is a division of my copending application for Tube Changer, Serial No. 506,339, filed May 5, 1955, now Patent 2,813,331.

Referring to the accompanying drawings.

The apparatus is supported on a machine base 15 on which are mounted standards 16 and 17. A tubular frame member 18 has a fixed mounting at its ends in the standards 16 and 17.

Figure 5:
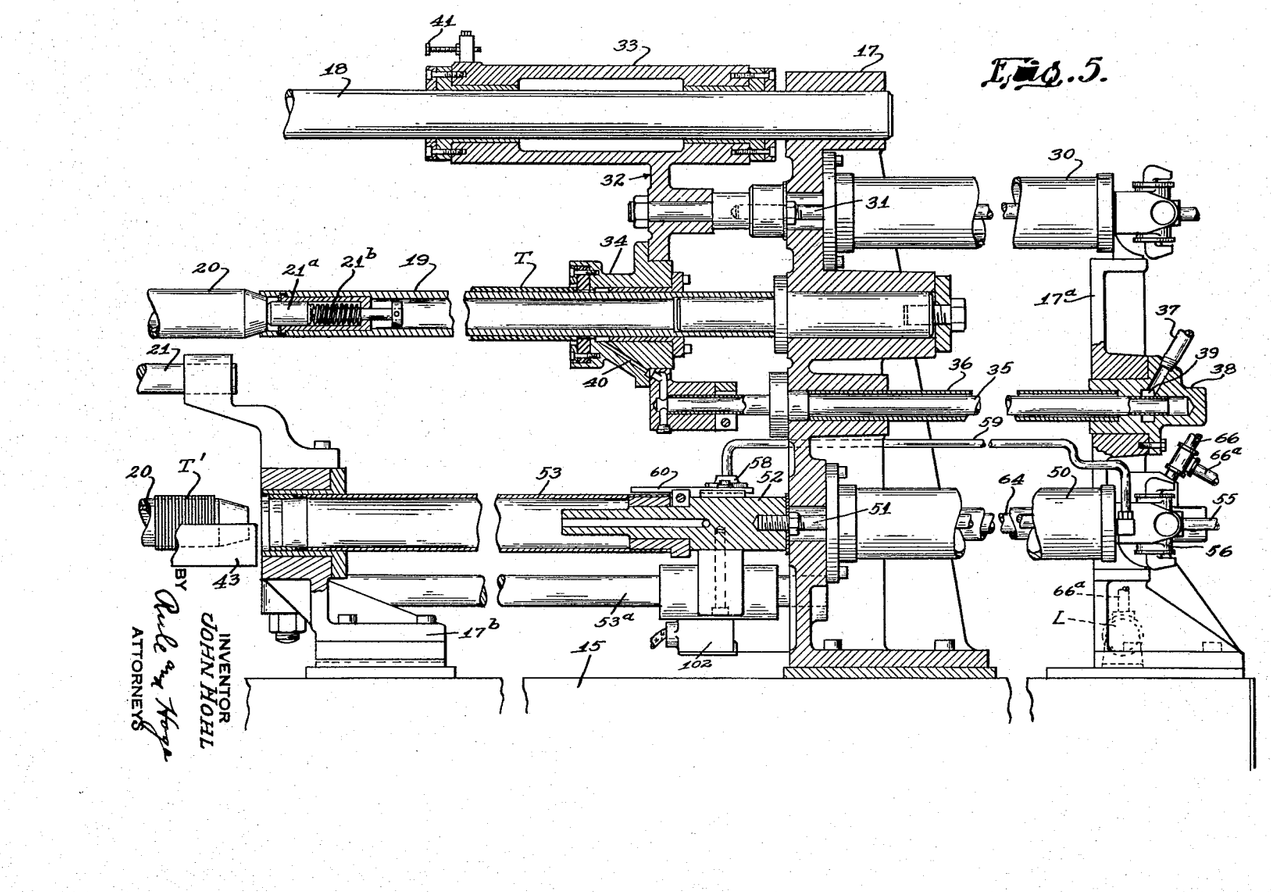
Fig. 5 is a sectional elevation at the line 5—5 on Fig. 4, parts being broken away.
Figure 6:
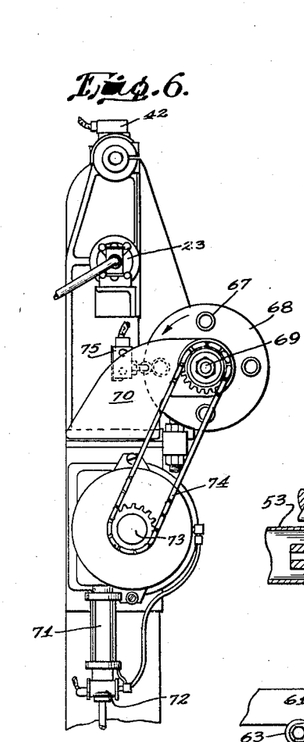
Fig. 6 is an end elevation.
Figures 10, 11:
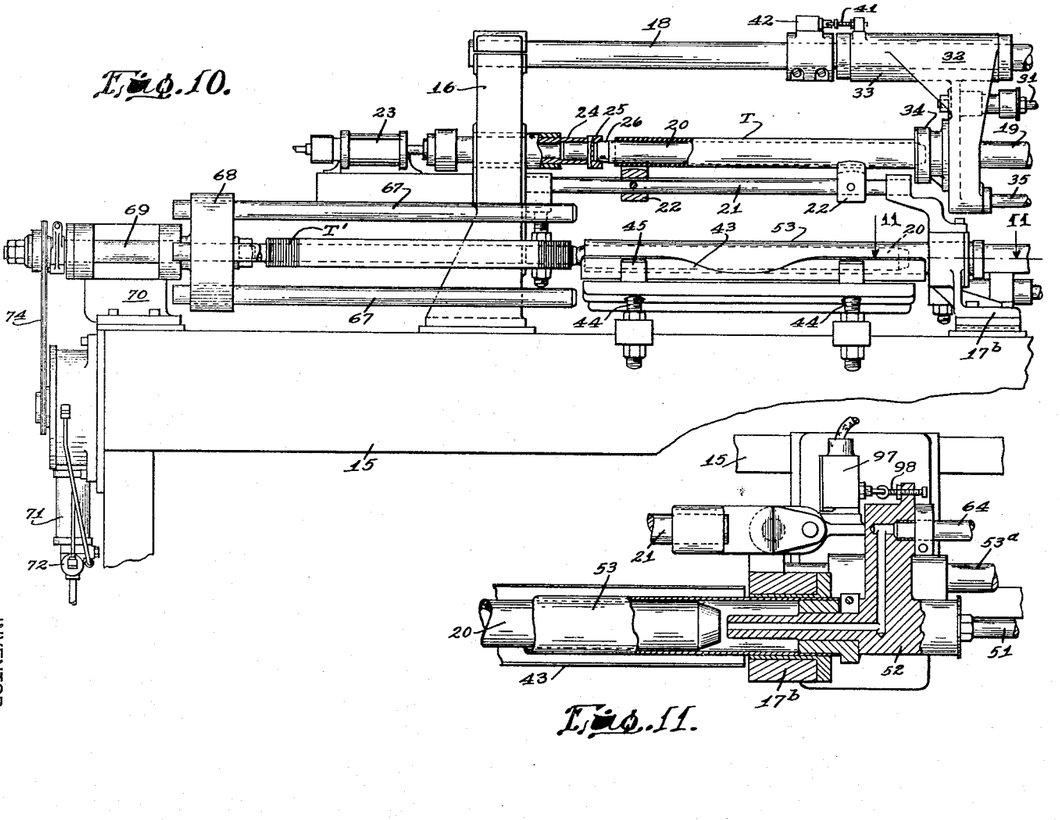
Fig. 10 is a front elevation of the apparatus with parts broken away and with movable parts in a different position from that shown in Fig. 1.
Fig. 11 is a fragmentary sectional view at the line 11—11 on Fig. 10.

Mounted on the standard 17 in fixed position is a horizontal tube 19 forming a holder adapted to receive a rubber tube T preparatory to mounting it on a mandrel 20. The empty mandrel is placed in a cradle 21, herein referred to as the 'blow-on cradle," said cradle comprising a horizontal rod to which there are attached V-shaped holders 22 to receive the mandrels. An air-operated motor or cylinder 23 (Fig. 10) has a stationary mounting on the machine base in line with the mandrel 20 while the latter is supported in the cradle. The cylinder 23 operates to move the mandrel 20 lengthwise into engagement with the blow-on tube 19. The cylinder 23 has its piston connected with a tubular member 24 slidably mounted and provided with a head 25 to engage the tapered end 26 of the mandrel 20. This construction permits the mandrel with the tube T thereon to be lifted clear of the cradle 22. The forward end of the mandrel 20 is also tapered as shown in Fig. 5 to engage the blow-on tube 19 by which it holds the mandrel clear of the cradle so as not to interfere with the tube T as the latter is moved lengthwise onto the mandrel.

Means for transferring the rubber tube T onto the mandrel comprises a horizontal cylinder 30 connected to the standard 17 and a standard 17ª. The piston rod 31 of this cylinder is connected to a slide bracket 32 formed with a tubular guiding member 33 slidable on the frame member 18. The bracket 32 has attached thereto a head 34, herein termed a "blow-on head." The head 34 is slidably mounted on the tube 19. The tube T when placed by the operator on the blow-on tube 19 bears against the head 34. When the cylinder 30 operates to project the head 34, the tube T is pushed onto the mandrel. Air under pressure is supplied to the blow-on head 34 to assist in transferring the tube T. This pressure air is supplied through a blow-on tube 35 attached to the head 34 and extending parallel with the cylinder 30. The tube 35 is mounted for lengthwise movement in a stationary tube 36, the latter having a fixed mounting in the standards 17 and 17ª. The air pressure is supplied through a pipe 37 extending to a port opening 39 in a head 38 in which the end portion of the tube 35 slides and which serves as a valve. When the blow-on head 34 is in its retracted position (Fig. 5) the port 39 is closed by the end portion of the tube 35.

Air pressure is supplied to the cylinders 23 and 30 simultaneously for effecting the transfer of the tube T onto the mandrel. The cylinder 23 operates very rapidly, moving the head 25 forward into engagement with the mandrel, then pushing the mandrel 20 forward into engagement with the tube 19 and simultaneously lifting it free of the cradle. The blow head 34 as it moves forward pushes the rubber tube forward so that the forward end of the tube T slides onto the mandrel. At the same time the blow tube 35 moves forwardly and after it has advanced a short distance, opens the port 39 so that air pressure is supplied through the tube 35 and through a channel 40 in the head 34. This air pressure operates to expand the tube T sufficiently to permit it to slide freely onto the mandrel. That is, the air pressure is applied between the tube T and the tube 19. As the blow head 34 nears the limit of its forward movement, a switch contact member 41 carried on the bracket 32 operates a reversing switch 42 controlling the air motors 23 and 30 as presently described so that the pistons of said motors are retracted, leaving the mandrel 20 with the tube T mounted thereon supported in the cradle 21. A push button 21$^a$ mounted in the tube 19 is projected outwardly by a compression spring 21$^b$ when the head 34 is withdrawn and separates the mandrel from the holder 19.

When the operator places an empty mandrel 20 in the cradle 21, he also places in a second cradle 43 a mandrel having mounted thereon a tube which has been cut into ring gaskets T'. The cradle 43 comprises V-shaped supports 45 carried on adjusting bolts 44. These supports and the corresponding V-shaped holders 22 of the cradle 21, serve as side supports by which the mandrel is held against lateral displacement.

The tube T' comprising the severed gaskets, is moved lengthwise off the mandrel by an air cylinder 50 mounted on the standards 17 and 17$^a$, below the cylinder 30. The piston rod 51 of the motor 50 is connected to a head 52 on which is mounted a horizontal tube 53, referred to as a "blow-off tube." The head 52 is slidably supported and guided on a stationary rod 53$^a$ attached at its ends to the standard 17 and a bracket 17$^b$ bolted to the machine base 15.

Figure 4:
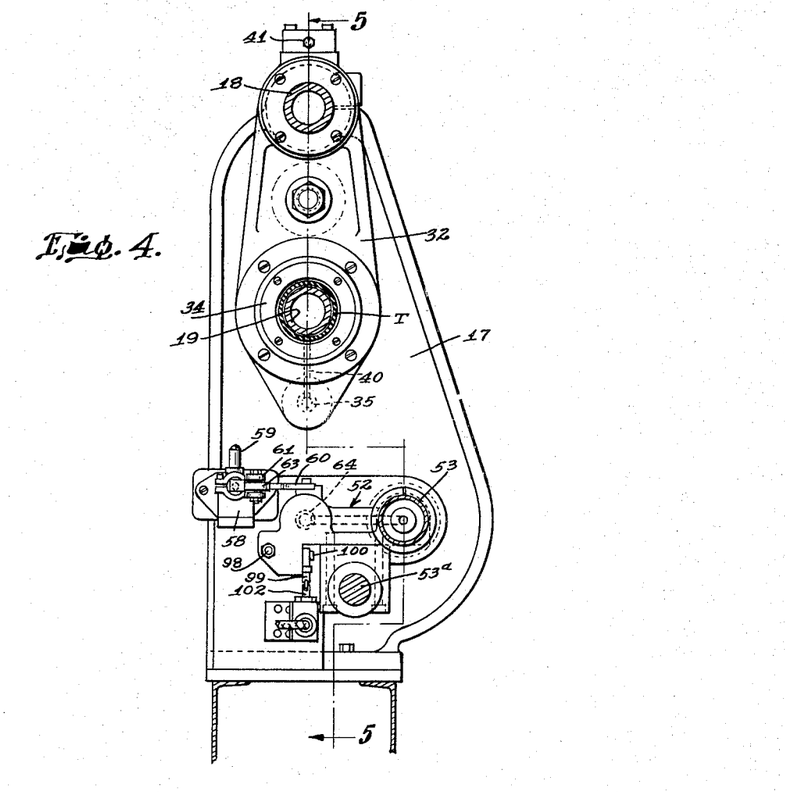
Fig. 4 is a sectional view at the line 4—4 on Fig. 1.
Figure 4A:
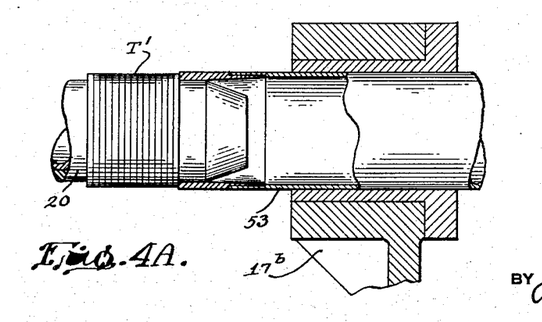
Fig. 4A is a detail view showing the "blow-off" tube in operative position.
Figure 8:
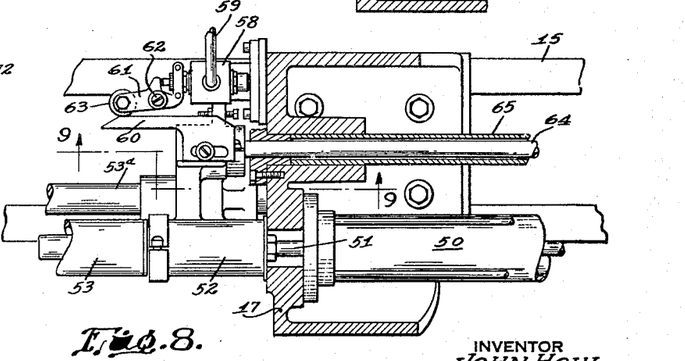
Fig. 8 is a fragmentary sectional view at the line 8—8 on Fig. 1.
Figure 13:
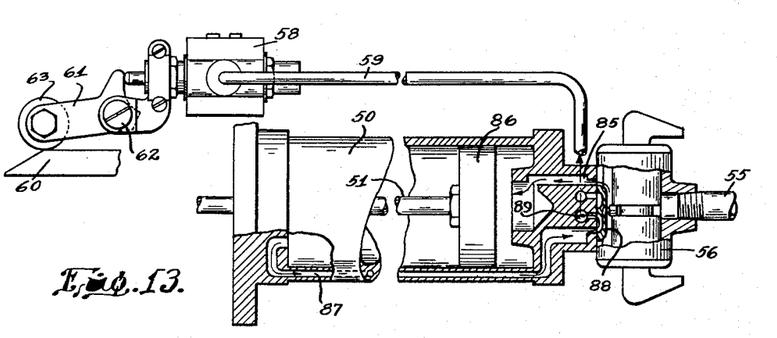
Fig. 13 is a part sectional view of the "gasket blow-off" cylinder and means for controlling its operation.

The tube 53 is in line with the mandrel on the cradle 43 and as shown in Fig. 4A is of an internal diameter to admit the mandrel while the end of the tube bears against the rings T'. While the blow-off tube 53 is advancing and pushing the rings off the mandrel, air pressure is maintained within the tube 53 and operates as presently described to assist in moving the rings off the mandrel. Air pressure for operating the cylinder 50 is supplied through a pipe 55 and control valve 56. During the initial forward stroke of the blow-off tube 53, the speed is retarded in order to permit the air pressure to get under the gaskets T' so that they are only loosely supported on the mandrel, thus permitting them to be moved freely along the mandrel as they are discharged therefrom. This retarding movement is under the control of a valve 58. The exhaust air from the cylinder 50 is passed through the valve 58 as presently described. The valve 58 is under the control of a cam 60 (Figs. 8 and 13) adjustably mounted on the head 52. The valve 58 is actuated by a rock arm 61 which swings on a pivot 62 and carries a cam follower roll 63. The cam operates the valve to throttle the air flow to an extent determined by the adjustment of the parts. The cam is also adjustable to adjustably vary the distance through which the tube 53 advances while the air is throttled. As the head 52 moves forward the cam operated lever 61 is released so that the forward movement of the tube 53 is no longer retarded. The means for controlling and directing the flow of air within the cylinder 50 and through the control valve 58 is as follows:

The air under pressure supplied through the pipe 55 is directed through a port 85 (Fig. 13) into the cylinder behind the piston 86 and moves the piston forward. The exhaust air in front of the piston is returned through a channel 87 which may be formed in the cylinder wall. A valve slide 88 in the valve head 56 directs the air through a port 89 to the pipe 59 extending to the valve 58. The flow of air through the valve 58 being throttled as above described produces a back pressure which retards the forward movement of the piston 86. When the valve 58 is opened by the roll 63 running off the cam 60 the back pressure is relieved permitting the piston to move forward at a higher speed. Valve solenoids 90, 91 (Fig. 12) control the reversal of the air motor 50. When the solenoid 90 is energized the valve slide 88 is reversed thereby supplying air pressure through the channel 87 for returning the piston 86, the exhaust air behind the piston being discharged through the port 85, pipe 59, and valve 58.

Figure 7:
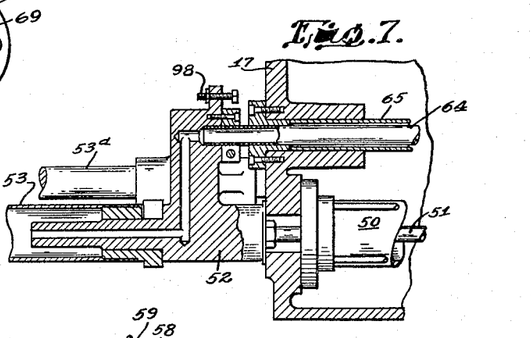
Fig. 7 is a fragmentary sectional plan view at the line 7—7 on Fig. 1.
Figure 9:
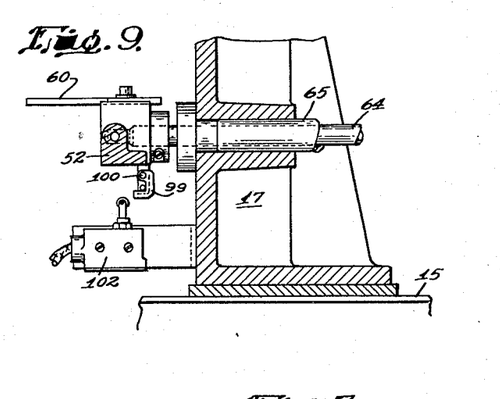
Fig. 9 is a section at the line 9—9 on Fig. 8.

Air under pressure is supplied within the tube 53 through a pressure tube 64 (Figs. 7 to 9), said tube being connected to the head 52 for reciprocating movement therewith. The tube 64 extends through a sleeve 65 mounted in the standards 17 and 17$^a$. Air pressure is supplied to the tube 64 through a pipe 66. The air supply during the initial movement of the tube 53 is retarded and controlled in the same manner as the air supply through the pipe 35 controlled at the valve port 39 by a like construction.

Figure 12:
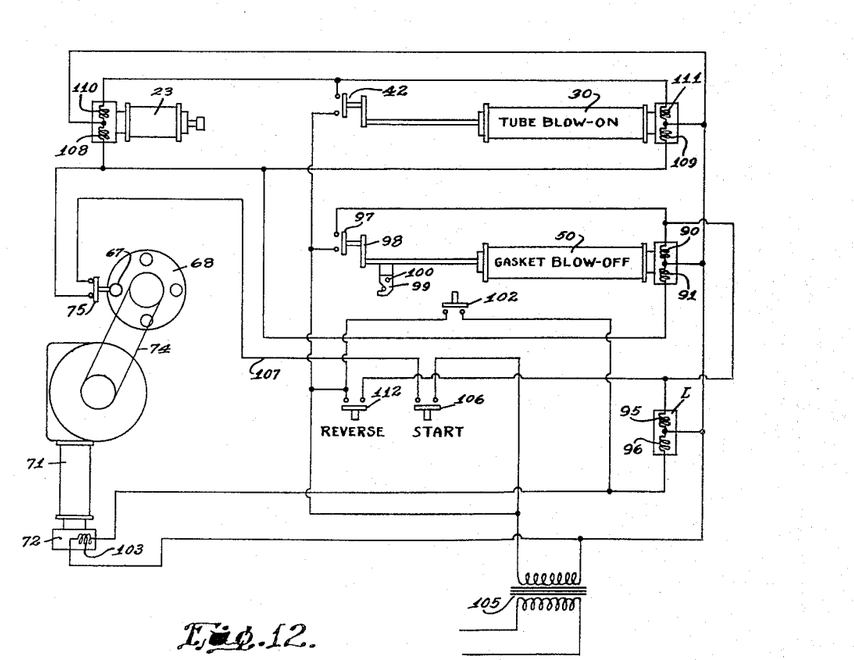
Fig. 12 is a schematic diagram of the apparatus, showing particularly the electrical control system.

The operation of the cylinder 50 for blowing the gaskets T' off the mandrel takes place concurrently with the operation of the cylinder 30 by which the tube T is moved onto the mandrel, air pressure being supplied to the cylinders 30 and 50 simultaneously. During the return stroke of the tube 53 the air pressure supplied through the head 52 is increased to insure the mandrel being blown out of the tube as the lower air pressure may not be sufficient to be relied on for this purpose. The mandrel remains at rest in the cradle 43 during the withdrawal of the tube 53 from the mandrel. The high pressure air is supplied through a pipe 66$^a$ under the control of a high pressure air valve L (Figs. 5 and 12). This valve comprises solenoids 95 and 96 for closing and opening the valve. A switch 97 having a stationary mounting is closed by an adjustable switch operating contact device 98 mounted on the head 52 for closing the switch as the tube 53 nears the end of its forward stroke. The closing of the switch 97 completes the circuit for the solenoid 95 thereby opening the high pressure valve L. The valve L is open during a portion of the return movement of the cylinder 50 and the tube 53 and then closed by means of a switch operating dog 99 (Figs. 9 and 12) on the head 52. The dog swings on a pivot 100. As the head 52 nears the end of the return stroke the dog 99 operates to close a switch 102. This completes a circuit through the solenoid 96 of the valve L, thereby closing the valve and shutting off the high pressure air. The closing of the switch 102 also completes a circuit for the solenoid 103 of the valve 72 so that the indexing cylinder 71 operates to impart a step rotation to the spider 68.

Means for receiving the ring gaskets T' from the mandrel includes horizontal rods 67 carried on a circular spider 68 on a shaft 69. The shaft is journaled in a bracket 70 on the machine base. The spider or head 68 is rotated intermittently step by step to bring the rods 67 in succession into line with and abutting the mandrels while the latter are supported in the cradle 43. The means for imparting step by step rotation to the head 68 comprises an air-operated cylinder 71 under the control of a solenoid valve 72. The cylinder has a conventional pawl and ratchet driving connection with a shaft 73. This includes a pawl 73$^a$ (Fig. 3A) connected to the piston rod 73$^b$ and driving a ratchet wheel 73$^c$ on the shaft 73. This motion is transmitted from the shaft 73 to the shaft 69 through a sprocket chain 74 and gears. A switch 75 has a stationary mounting in position to be controlled by the rods 67, the switch being closed only while a rod 67 is in position to receive the ring gaskets from a mandrel in the cradle 43.

Figure 1:
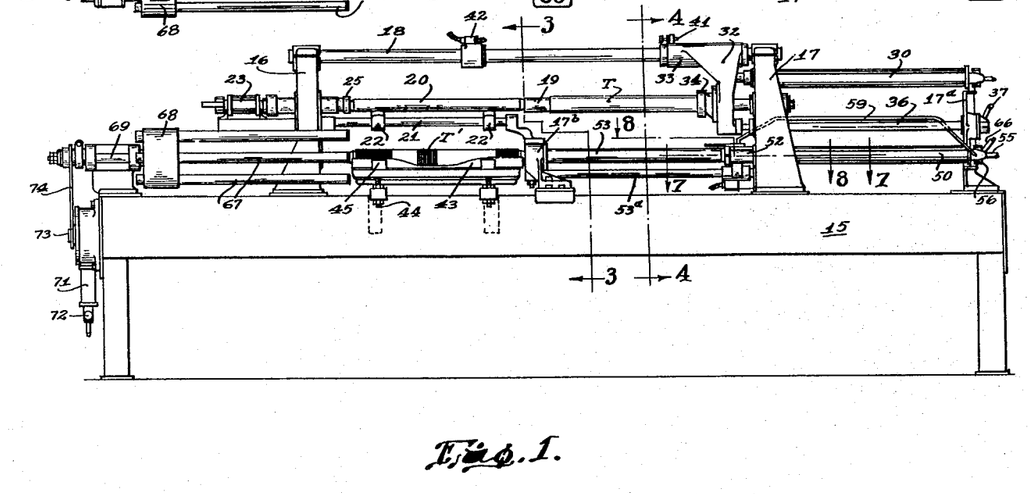
Fig. 1 is an elevational view of an apparatus for loading the rubber tubes onto the mandrels and for unloading the tubes from the mandrel after the tubes have been cut into ring gaskets.
Figure 2:
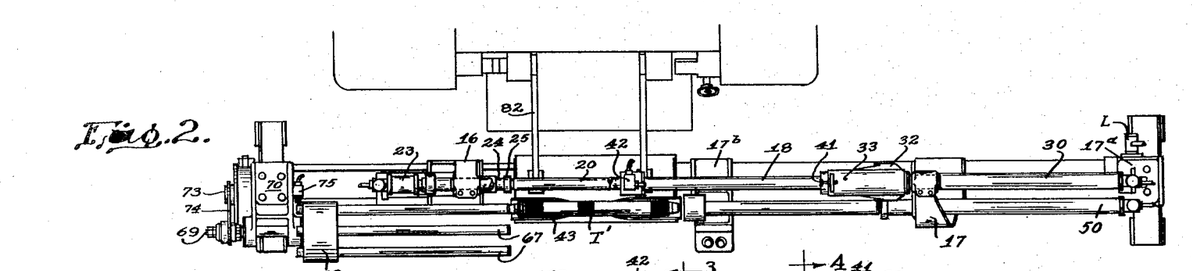
Fig. 2 is a plan view of the same.
Figures 3, 3A:
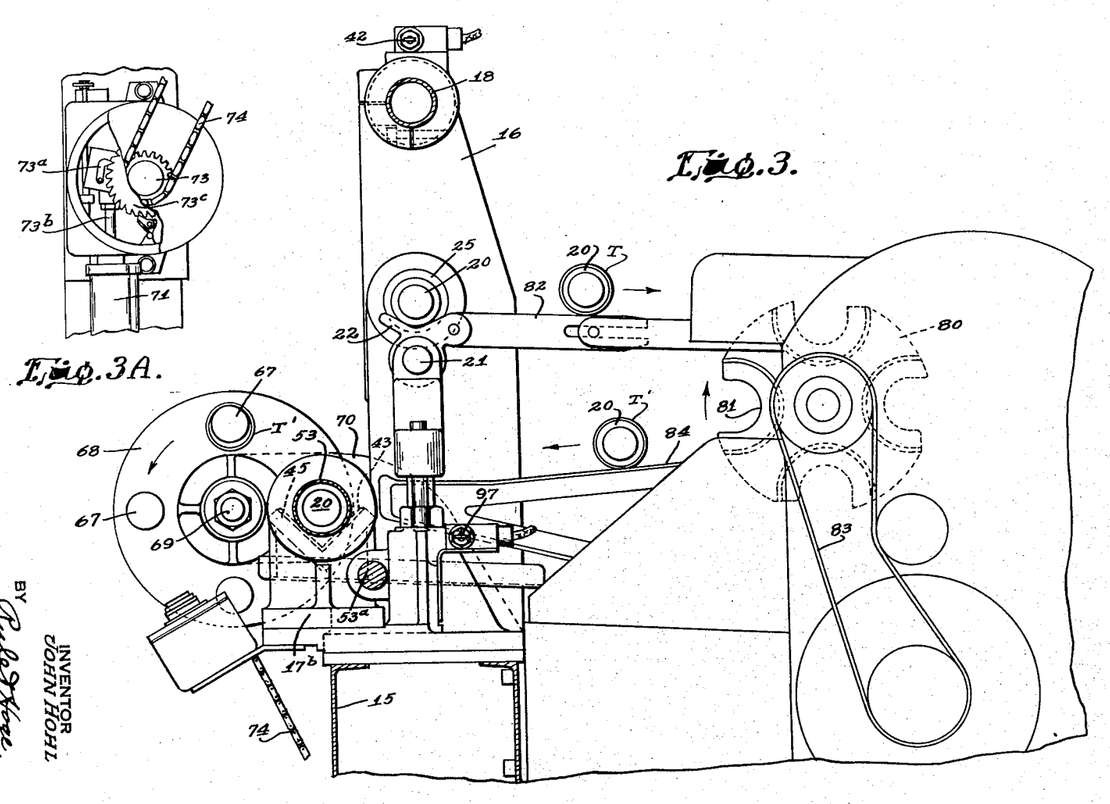
Fig. 3 is a cross-sectional elevation at the line 3—3 on Fig. 1, on a larger scale.
Fig. 3A is a detail view of indexing means for the ring holders.

Referring to Fig. 3, there is provided means for transferring the loaded mandrel to the gasket cutting machine and, after a tube has been cut into ring gaskets, returning the mandrel to the unloading station where the cut gaskets are transferred to one of the arms 67. The gasket cutting machine includes a mandrel carrier 80 with cradles 81. Forwardly and downwardly inclined guide bars 82 provide a runway extending from the cradle 21 to the carrier 80. The operator places a loaded mandrel on the runway permitting it to roll to the carrier 80. The latter is rotated step by step in a clockwise direction, being driven by a belt 83 so that the cradles 81 receive the loaded mandrels and transfer them to a cutting station where the tube is cut into gaskets by a cutter (not shown). The mandrels carrying the cut gaskets are returned on a lower inclined runway 84 to a position adjacent to the cradle 45 onto which the mandrels are placed by the operator as heretofore described.

*Operation*

The sequence of operations will now be described having reference to the wiring diagram (Fig. 12). Electric current for operating the control devices is supplied through a transformer 105. The operator first places an empty tube T on the holder 19, places an empty mandrel 20 in the cradle 21 and a mandrel loaded with gaskets T' in the cradle 43. He then closes the manual starting switch 106 which completes a circuit from the transformer secondary through the lead 107, switch 75, and starting solenoid 108 of the mandrel centering cylinder 23. The circuit is also completed through the solenoid 91 of the gasket blow-off cylinder 50 and through solenoid 109 of the tube blow-on cylinder 30 so that the cylinders 23, 30, and 50 are all brought into operation. The cylinder 23 operates quickly to advance the head 25 (Fig. 10) and align the loaded mandrel 20 with the holder 19. The cylinder 30 operates to move the head 34 (Fig. 5) forwardly and push the tube T onto the mandrel 20. As soon as the head 34 has moved forwardly a short distance, the port 39 (Fig. 5) is opened to supply air pressure between the tube T and the carrier 19 as heretofore described. The blow-off cylinder 50 operates concurrently with the cylinder 30 but its movement is restricted during the initial portion of its advance by the back pressure of the exhaust air under the control of the cam 60 (Fig. 13) and the valve 58. When the valve is released from the control of the cam, the restriction is removed permitting unrestricted forward movement of the blow-off tube 53. When the tube 53 has advanced a short distance the air pressure supplied through the tube 64, which is throttled during the initial movement, is opened to the pipe 53 for supplying low pressure air between the mandrel and the ring gaskets T' while the latter are being pushed off the mandrel. During the forward movement of the pipe 53 to transfer the gaskets to the rod 67 the rod serves as a stop which positively prevents the mandrel from moving forward lengthwise with the gaskets. As the piston of the cylinder 30 is completing its forward stroke it closes the switch 42. This completes the circuit for the valve solenoid 110 for reversing the cylinder 23 and also completes a circuit through solenoid 111 which reverses the blow-on cylinder 30. The cylinder 23 now retracts its piston permitting the push button 21ᵃ (Fig. 5) to disengage the mandrel 20 from the holder 19 leaving the mandrel free in the cradle 21. The cylinder 30 also retracts the head 34. The cylinder 50 as it completes its forward stroke closes the switch 97 and completes the circuit for the solenoid 90 so that the cylinder 50 is reversed. At the same time the circuit is completed through the solenoid 95 of the high pressure valve L so that high pressure air is supplied through the tube 53 for blowing the mandrel out of the tube. During the retracting movement of the cylinder 50 the dog 99 closes the switch 102. This makes a circuit for the solenoid 96, so that the valve L cuts off the high pressure air. The closing of the switch 102 also makes the circuit for the solenoid 103 of the indexing cylinder 71 so that the latter operates to index the spider 68. The operator can now remove the loaded mandrel from the cradle 21 and place it on the runway 82 (Fig. 3) by which it is transferred to the gasket cutting machine. This completes the cycle. A reversing switch 112 may be closed at any time by the operator for making a circuit through the solenoid 90 and thus retracting the blow-off tube 53 from any intermediate position. Closing of the reversing switch also operates to shut off the high pressure valve L.

Modifications may be resorted to within the spirit and scope of my invention.

I claim:

1. Apparatus for unloading rings from a mandrel, comprising a cradle in which a loaded mandrel is supported in horizontal position and free for movement lengthwise within the cradle, a spider mounted for rotation about a horizontal axis, receiving rods for said rings, each rod connected at one end to said spider and extending horizontally therefrom, said rods being symmetrically arranged about the axis of the spider, means for rotating the spider whereby the rods are brought in succession into axial alignment with a loaded mandrel in the cradle, and pusher means movable axially of a cradled mandrel for pushing the rings off the mandrel onto one of said rods, each of the rods while in line with a loaded mandrel being in abutting relation to the mandrel and forming a stop by which the mandrel is held against lengthwise movement while the rings are being pushed off of the mandrel and onto the rod.

2. Apparatus for unloading rubber-like ring gaskets from a cylindrical mandrel, said apparatus comprising a horizontally disposed cradle in which the mandrel with cut ring gaskets thereon is held with the mandrel in a horizontal position, said cradle comprising side supports by which the mandrel is held against lateral displacement while in said horizontal position within the cradle and with the mandrel free for up and down movement in the cradle, a gasket receiving rod over which gaskets being unloaded from the mandrel are telescoped, means for holding said rod stationary at one end of the cradle mandrel during unloading of the gaskets from the latter, the rod being in horizontal alignment with and abutting an end of the mandrel thereby holding the latter against axial movement in one direction during unloading of the gaskets therefrom, a blow-off tube mounted in axial alignment with and adjacent one end of the mandrel for horizontal movement in the direction of its length and over the latter, said tube being positioned at that end of the mandrel opposite said rod and in axial alignment therewith and being of an internal diameter to readily telescope over the mandrel and means for moving said tube lengthwise over the mandrel while the latter is supported in the cradle and thereby pushing the ring gaskets axially off of the mandrel and onto said rod.

3. Apparatus as defined in claim 2, the mandrel having at least one end closed and means for supplying air under pressure within said tube and thence between the rings and mandrel whereby to expand the rings and facilitate their sliding freely along the mandrel.

4. Apparatus as defined in claim 2, the mandrel having at least one end closed, said apparatus including means for supplying air under pressure within the tube upon initial telescoping of the latter over the mandrel and thereby supplying air under pressure between the rings and mandrel to expand said rings sufficiently to permit their sliding freely along the mandrel, the tube moving means comprising a piston motor including a piston, a head connected to said piston and the means for supplying air under pressure to the tube including an air line extending through said head and opening into the tube.

(References on following page)

References Cited in the file of this patent

UNITED STATES PATENTS

| | | |
|---|---|---|
| 1,322,843 | Townsend | Nov. 25, 1919 |
| 1,525,765 | Brenner | Feb. 10, 1925 |
| 1,852,613 | Jessen | Apr. 5, 1932 |
| 1,976,991 | Hersam | Oct. 16, 1934 |
| 2,072,840 | Temple | Mar. 2, 1937 |
| 2,263,778 | Howard | Nov. 25, 1941 |
| 2,425,170 | Wunsch et al. | Aug. 5, 1947 |
| 2,429,938 | Mansfield | Oct. 28, 1947 |
| 2,604,658 | Broden | July 29, 1952 |
| 2,630,600 | Boggs | Mar. 10, 1953 |
| 2,645,004 | Dorner | July 14, 1953 |
| 2,670,576 | Hockett | Mar. 2, 1954 |

OTHER REFERENCES

Product Engineering, August 1949, pp. 121–126, "Elementary Wiring Diagrams for Machine Analysis."